Patented May 25, 1948

2,441,946

UNITED STATES PATENT OFFICE 2,441,946

PROCESS FOR MAKING SOYBEAN PROTEIN-PHENOLIC RESIN ADHESIVE AND PRODUCT

Russell H. Hieronymus, Cincinnati, Ohio, assignor to The Drackett Company, Cincinnati, Ohio, a corporation of Ohio No Drawing. Application April 17, 1945, Serial No. 588,891

5 Claims. (Cl. 260—7)

This invention relates to the preparation of waterproof adhesives capable of setting under heat and pressure to an infusible state. The adhesives contemplated herein are of the type obtained by reacting vegetable protein with a phenolic resin, sometimes called protein-resins, as distinguished from adhesives in which protein is introduced primarily as an extender. It is an object of the invention to provide an improved adhesive having properties which render it especially useful in the bonding of plywood and other laminated fibrous articles requiring penetration by the adhesive of the materials to be united.

An adhesive prepared in accordance with the present invention may exhibit the following properties:

A. High wet and dry strength.
B. Regulated penetration of the fibers to be joined to prevent either starved joints or inadequate penetration.
C. Satisfactory performance whether bonded immediately upon spreading or after an extended period.
D. Freedom from deterioration when stored.

These and other desirable characteristics are obtained by following the series of processing steps outlined herein, both the individual steps and the order in which they are taken being of significance. First, an aqueous solution of a phenolic formaldehyde resin, substantially devoid of free phenol and containing only a small amount of free formaldehyde, is reacted with a vegetable protein, for example, soybean protein. The ratio of the amounts of formaldehyde and water to protein in the reacting mass are maintained within prescribed limits, the amount of free formaldehyde being especially critical. If properly controlled, the reaction product is in the form of a friable granular gel, and this gel is milled with a small percentage of an alkaline substance to produce a brittle mass which may be ground to a finely divided state and stored for further use. The mass so ground is readily dispersible in water, and when so dispersed spreads readily on the surfaces to be joined but does not penetrate fibrous material too rapidly, either on application or during hardening by heat and pressure. I prefer to introduce furfural in the reaction mixture, adding at least a substantial part of the furfural to the protein immediately before admixture of the latter with the phenolic resin, so that the protein is wetted by the furfural to prevent lumping of the protein particles in the resin.

One method of producing a satisfactory adhesive in accordance with the invention is as follows: Isolated soybean protein is admixed with furfural in the proportion of 18 parts of protein to 12 parts of furfural. After the protein has been wetted and before any significant reaction occurs, 53 parts of a phenolic formaldehyde resin solution of approximately 63% solids content is added, the solution containing no appreciable free phenol, and containing free formaldehyde in amount approximately 2.2% by weight of the amount of protein. The moisture content of the reacting mass is approximately equal to the amount by weight of protein.

The mass is stirred rapidly for a period of from one to three hours to effect solution and reaction of the protein with the phenolic resin-furfural medium, and during the stirring of the mass should pass from a syrupy consistency to a thick gel and thence to a friable granular state.

The friable granulated gel is dried at a temperature of about 60° C. to approximately 14% moisture content, and the dried mass is then milled with sodium hydroxide in amount of 3½% by weight of the mass. During milling the temperature is maintained below 70° C., for example, by the use of milling equipment having provision for dissipation of the heat of reaction, and the milling is continued for a period of twenty minutes, when the material will be found to be brittle at room temperature. The brittle mass is then ground to a finely divided state, sized, and a parting agent consisting of 1% zinc stearate and .5% sodium soap is added to prevent caking on storage. The material is then packaged and stored in a cool place for subsequent use in the conventional manner, for instance, dispersion in water, spreading on the surfaces to be united, and the application of heat and pressure to harden.

The initial condensation resin solution may be prepared in any conventional manner with the aid of an alkaline catalyst. One satisfactory method is to mix 31 parts of caustic soda with 1600 parts of formaldehyde (solution containing 37½% HCHO by weight), stirring until a solution is obtained. One thousand parts of phenol are then added and the reaction proceeds with a slight rise in temperature for about fifteen minutes. The temperature is then increased slowly, requiring thirty to forty-five minutes—the time varying with the size of the batch, from approximately 100° F. to a range between 135° to 145° F. The temperature is then held in this range while the reaction mixture is stirred and refluxed for five hours. Excess formaldehyde is then removed by dewatering under vacuum of twenty-two inches at a temperature of 140 to 150° F. for twenty to twenty-five minutes. The resulting resin solution should be water soluble, have a pH of approximately 9.2 to 9.4, a solids content from 62 to 65%, and contain approximately 0.6 to 0.8% free formaldehyde. This is a method of producing a resin solution which is known in the art, and the details of the method form no part of the instant invention.

It is preferable to employ an excess of formaldehyde to insure complete reaction of all phenol, since it is important to the proper practice of the present invention that phenol be substantially eliminated. However, if free phenol is present, it may be removed by adding lime in sufficient quantity to react with the free hydroxyl groups of the phenol, thus forming an insoluble calcium phenate. The phenate remains in the resin solution, since the resin coagulates in the presence of lime, but the coagulated resin may be worked with protein on a roll mill together with alkali to form an adhesive material. Adhesive thus produced is inferior, however, to the adhesive obtained by the use of a phenolic resin which has been formed with an excess of formaldehyde to insure complete removal of all free phenol.

It will be appreciated that the dewatering operation by means of which the excess of formaldehyde is removed must be adjusted as to time, temperature and pressure to yield the desired range of free formaldehyde and solids content, the selection of appropriate conditions being within the skill of the art. Another method of reducing the free formaldehyde content to the desired value is to allow the solution to stand at room temperature open to atmosphere for approximately 8 to 12 days; this method can be accelerated somewhat by causing air to flow over the open solution.

As heretofore indicated, I may use any vegetable protein for reaction with the resin solution, but the preferred material is soybean protein. Such protein may be used in the form of the whole meal, due allowance being made for the presence of inert constituents in proportioning the amounts employed, but best results are obtained by the use of protein which has been isolated, for example by the process outlined in my prior Patent No. 2,274,983, granted March 3, 1942. Excessive denaturing of the protein, such as would reduce its solubility in water, should be avoided. The amount of protein should not be substantially less than 10% nor substantially greater than 40% by weight of the final dried adhesive.

The amount of formaldehyde which should be present in the reaction depends on the amount of protein and is critical. If the amount by weight of formaldehyde is less than 1% of the amount of protein, the resulting resin-protein gel will remain tacky and is exceedingly difficult to handle and to dry in commercial manufacture; if more than 3% formaldehyde is present, the protein becomes hardened and insoluble. The phenol can be replaced by cresol, the reaction carried on for the same length of time using the same amount of catalyst and formaldehyde, but a slightly lower reaction temperature. In general, homologues of phenol, such as xylenol and resorcinol, can be employed to replace only part of the phenol, and require the use of considerably lower temperature because of lack of stability. The expression "phenolic formaldehyde resin" as employed herein includes within its scope only resins of which the phenolic constituent consists principally of phenol and cresol, or of a mixture thereof.

The amount of water present during the reaction should also be suitably controlled. Satisfactory results are not achieved when the moisture content is substantially less than 39% of the weight of protein present, and preferably is of the order of 100 to 125% by weight of protein, although moisture contents up to 200% and in some cases even higher may be tolerated. In the event soybean meal rather than isolated protein is employed, the minimum moisture content should be adjusted upwardly to compensate for moisture absorption by the non-protein content. The moisture content of the dried reaction product is also critical. If below 10 or 11% by weight of the reaction product, the adhesive will not mill properly on subsequent addition of alkali. If the moisture content at this stage exceeds 17%, too much reaction occurs between the alkali and the protein, and insufficient reaction takes place between the alkali and the resin and furfural, resulting in poor distribution of alkali, poor solubility of final adhesive, higher viscosity, and lack of catalyst for setting the adhesive.

Ground caustic soda is the preferred alkali, although other alkaline metal compounds, such as potassium hydroxide, sodium or potassium carbonates, may be used. Alkalis which tend to produce insolubility, such as lime, are undesirable. Preferably the smallest amount of alkali sufficient to produce the desired solubility and catalytic action is employed, and the amount of alkali may, in general, range from 2 to 7% of the final weight of the adhesive. Higher alkali contents tend to reduce storage life and boil resistance. A satisfactory adhesive solution should show a pH in the neighborhood of 9 to 10.

The equipment employed for milling in the adhesive may be of any conventional type, but is preferably provided with means for controlling the temperature, which tends to rise during the alkali reaction. A suitable temperature range is from about 40° to about 70° C. and the time required for milling is generally ten to twenty minutes but is not critical. Milling should be continued until the mass is brittle at room temperature and capable of being ground to a finely divided state.

In the foregoing specific example, the furfural is admixed with the protein before addition of the resin solution, and the use of furfural at this stage is exceedingly beneficial. However, all of the furfural need not be added prior to the admixture of the resin and protein; enough should be added to the protein to facilitate wetting of the protein by the resin and to prevent lumping; the remainder may be added to the protein-resin reaction mixture or on the rolls during milling. The amount of furfural employed may vary from 25% to 75% by weight of the protein. In addition to the wetting action hereinbefore noted, the furfural improves the solubility of the adhesive in water, reduces the viscosity of the glue solution to a state suitable for spreading, and improves penetration of the adhesive into the fibres under heat and pressure. The setting time of the adhesive and its bonding strength, both wet and dry, are increased by the furfural.

The ground and stored adhesive is readily soluble in water and may be applied in the following manner:

70 parts of water and 30 parts of adhesive are rapidly stirred for ten or fifteen minutes to form a smooth paste. The paste is warmed to 40° C.

in a water bath and stirred fifteen minutes, or is stirred at room temperature for a total of forty-five minutes.

Forty-five pounds of the resulting glue may be applied to 1000 square feet single glue line. Pressure at 75 to 200 p. s. i. and heat from 320 to 330° F. are then applied for seven or eight minutes, either immediately following application of the glue or at any time during a period of twenty-four hours thereafter.

Having thus described the invention, what is claimed as new and desired to be secured by Letters Patent is:

1. In a process of making a waterproof protein-resin adhesive capable of setting under heat and pressure to an infusible state, the steps which comprise stirring an aqeous alkaline solution of an alkali catalyzed phenolic-formaldehyde resin in which the phenolic constituent is selected from the group consisting of phenol, cresol, and mixtures thereof, said resin being substantially devoid of free phenol and containing a small quantity of free formaldehyde, with soybean protein in amount 10% to 40% by weight of the final dried adhesive to effect reaction between the protein and resin and to produce a friable granular gel, the amount of free formaldehyde present initially being from 1% to 3% by weight of the protein, drying the gel to from 10% to about 17% moisture, milling with alkali selected from the group consisting of alkali metal hydroxide and carbonates to obtain a mass which is brittle at normal temperature, and grinding the mass to a finely divided state.

2. A waterproof protein-resin adhesive, dispersible in water and capable of setting under heat and pressure to an infusible state, said adhesive being prepared as recited in claim 1.

3. In a process of making a waterproof protein-resin adhesive capable of setting under heat and pressure to an infusible state, the steps which comprise adding to soybean protein a quantity of furfural sufficient to facilitate wetting of the protein and to prevent lumping, stirring with the protein and added furfural an aqueous alkaline solution of an alkali catalyzed phenolic-formaldehyde resin in which the phenolic constituent is selected from the group consisting of phenol, cresol, and mixtures thereof, said resin being substantially devoid of free phenol and containing free formaldehyde in amount 1% to 3% by weight of protein, the protein being present in amount 10% to 40% by weight of the final dried adhesive, and the moisture content of the reaction mixture being not less than 37% by weight of the protein, to effect reaction between the protein and resin and to produce a friable granular gel, drying the gel to from 10% to about 17% moisture, milling with alkali selected from the group consisting of alkali metal hydroxide and carbonates in amount 2% to 7% by weight of the final dried adhesive to obtain a mass which is brittle at normal temperature, and grinding the mass to a finely divided state.

4. In a process of making a waterproof protein-resin adhesive capable of setting under heat and pressure to an infusible state, the steps which comprise adding to soybean protein a quantity of furfural sufficient to facilitate wetting of the protein and to prevent lumping, stirring with the protein and added furfural an aqueous alkaline solution of an alkali catalyzed phenolic-formaldehyde resin in which the phenolic constituent is selected from the group consisting of phenol, cresol, and mixtures thereof, said resin being substantially devoid of free phenol and containing free formaldehyde in amount 1% to 3% by weight of protein, the protein being present in amount 10% to 40% by weight of the final dried adhesive, to effect reaction between the protein and resin and to produce a friable granular gel, drying the gel to from 10% to about 17% moisture, milling with alkali selected from the group consisting of alkali metal hydroxide and carbonates to obtain a mass which is brittle at normal temperature, and grinding the mass to a finely divided state.

5. In a process of making a waterproof protein-resin adhesive capable of setting under heat and pressure to an infusible state, the steps which comprise stirring an aqueous alkaline solution of an alkali catalyzed phenolic-formaldehyde resin in which the phenolic constituent is selected from the group consisting of phenol, cresol, and mixtures thereof, said resin being substantially devoid of free phenol and containing a small quantity of free formaldehyde, with soybean protein in amount 10% to 40% by weight of the final dried adhesive, and the moisture content of the reaction mixture being not less than 37% by weight of the protein, to effect reaction between the protein and resin and to produce a friable granular gel, the amount of free formaldehyde present initially being from 1% to 3% by weight of the protein, drying the gel to from 10% to about 17% moisture, milling with alkali selected from the group consisting of alkali metal hydroxide and carbonates to obtain a mass which is brittle at normal temperature, and grinding the mass to a finely divided state.

RUSSELL H. HIERONYMUS.

REFERENCES CITED

The following references are of record in the file of this patent:

UNITED STATES PATENTS

| Number | Name | Date |
| --- | --- | --- |
| 1,503,392 | Turkington | July 29, 1929 |
| 1,877,202 | Satow | Sept. 13, 1932 |
| 2,066,857 | Rozema | Jan. 5, 1937 |
| 2,190,672 | Meharg | Feb. 20, 1940 |
| 2,360,376 | Van Epps | Oct. 17, 1944 |
| 2,389,183 | Cone | Nov. 20, 1945 |

OTHER REFERENCES

Brother et al., Ind. & Eng. Chem., Nov. 1938, vol. 30, pp. 1236, 1239 and 1240.

Taylor, Chem. & Met. Eng., April 1936, vol. 43, pp. 172 and 176.